Sept. 7, 1954    J. W. GRAY ET AL    2,688,440
GREAT CIRCLE COMPUTER
Filed Oct. 31, 1950
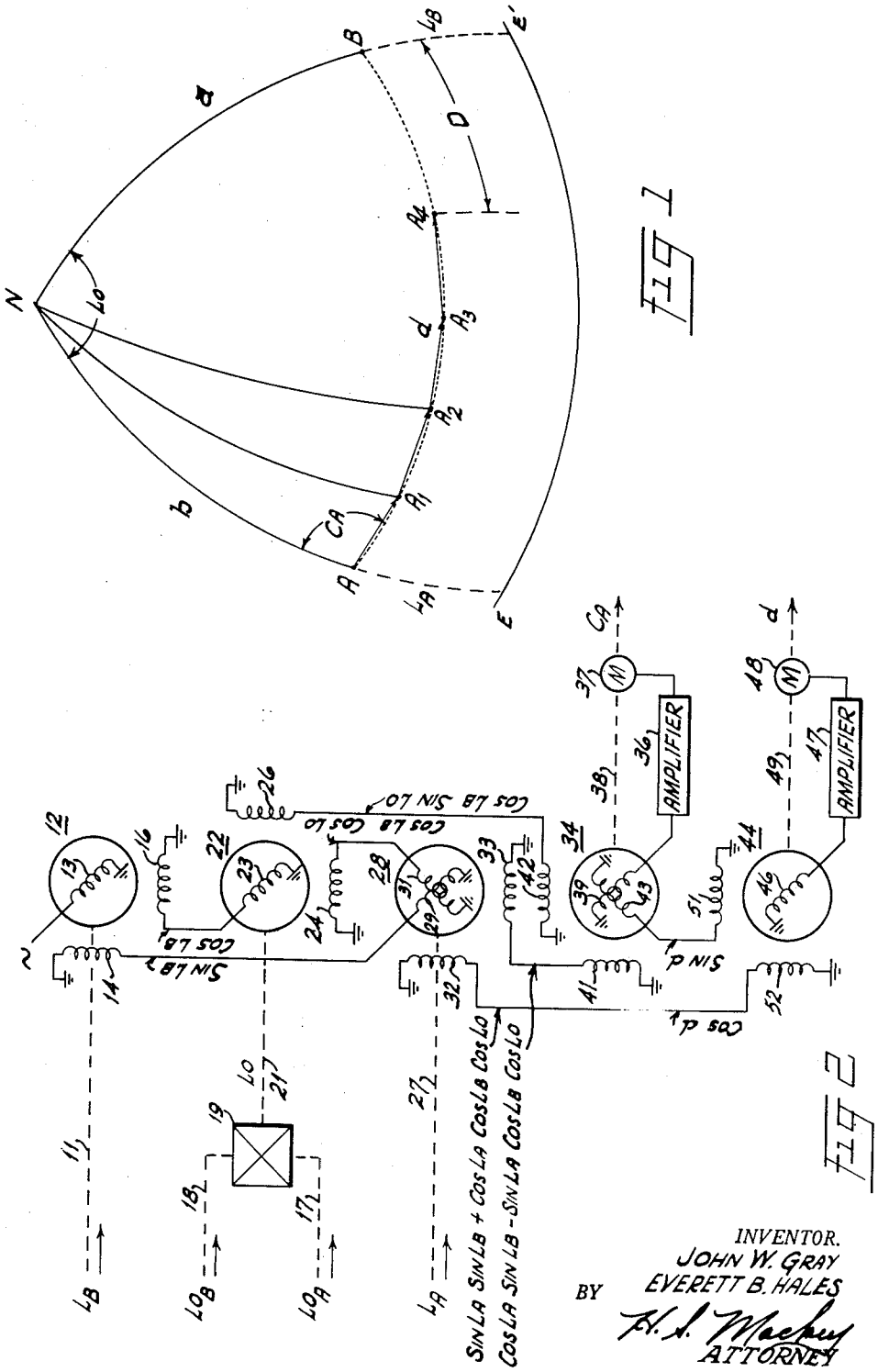
INVENTOR.
JOHN W. GRAY
EVERETT B. HALES
BY
H. S. Mackey
ATTORNEY Patented Sept. 7, 1954

2,688,440

UNITED STATES PATENT OFFICE 2,688,440

GREAT CIRCLE COMPUTER

John W. Gray, White Plains, and Everett B. Hales, Hawthorne, N. Y., assignors to General Precision Laboratory Incorporated, a corporation of New York Application October 31, 1950, Serial No. 193,168

14 Claims. (Cl. 235—61)

This invention pertains to a computer for use in the navigation of any vehicle relative to the earth's surface and more particularly to a computer for determining the course angle for following great circle routes.

A basic problem of navigation is the computation of the great circle course between two points on the earth's surface. Such a course follows the shortest path between two points but in following it the course angle continuously changes. In the case of ocean vessel navigation, the course angle is frequently recomputed and reset; the course is then a series of chords joining the various points on the approximate path of the great circle route. In the case of air navigation, recomputation and resetting of the course must be more frequent, because of the greater speed of the aircraft, and it is far preferable to make the recomputations continuously and automatically.

The computer of the present invention solves for both the course angle and the distance remaining to destination, and does it automatically, so that if continuously corrected input data are presented to the computer, the output course will be continuously computed and the remaining distance to destination is continuously indicated. The initial input data for this computer consists of the latitude and longitude of the destination and of the starting point. When the position of the destination is fixed, the only data to be furnished during the journey are the continuous changes in the instant latitude and longitude of the vehicle. However, should the destination be altered after the vehicle has left the original fixed point of departure, the present invention is capable of responding to new input data, including the latitude and longitude of the new destination, to compute a new great circle route from the instant position of the vehicle to the new destination. In other words when data is set in the device which corresponds to two points on the earth's surface, one of which is the instant position of the vehicle, the device will immediately and continuously compute the course angle for a great circle route to the other point. The manner of securing the input data is outside of the scope of this invention; they may be secured by frequent or continuous celestial observation, by manual or automatic dead reckoning means based on compass and ground speed data, by radar or other electronic navigation aids or in any other way.

In the instant invention representations of latitudes and longitudes, constituting the input data, are presented to the computer in the form of angular shaft displacements. By means of five principal components which resolve, multiply, divide, add, subtract, and solve triangles, two output shafts are continuously repositioned, one representing the course in terms of azimuth angle and the other representing the distance in terms of great circle angle.

A purpose then of the computer of this invention is to provide continuous data for the navigation of a vehicle, the data consisting of information giving course and distance to destination, in terms of azimuth angle, derived from input data including the positions of the original points of departure and destination or any subsequent known instant position of the vehicle.

Another purpose of this computer is to serve as a calculating instrument for the solution of any spherical triangle, the inputs being the coordinates of any two apexes and the calculated values being the distance between the two apexes and the direction of the line joining them.

A further understanding of this invention may be secured by reference to the detailed description and accompanying drawing, in which:

Figure 1 is a schematic representation of an illustrative application of the present invention; and Figure 2 is a schematic circuit diagram of apparatus embodying the present invention.

Referring now to the drawing, Fig. 1 depicts a spherical triangle ABN on the earth's surface. The letters A and B represent, respectively, the original points of departure and destination of a journey to be made by a vehicle, such as an airplane, over a route indicated by the arc $d$. Obviously, because of the earth's curvature, the most direct route is a great circle. Since the operation of the present invention is based on great-circle navigation the length of the arc $d$ can be represented in terms of degrees of a great circle. The great-circle arcs $a$ and $b$ connect respectively, B and A with N, which latter represents the North Pole; $a$ and $b$ are therefore meridians and the angle $L_0$ is the difference in longitude between A and B. The equator is represented by the line EE', $L_A$ and $L_B$ representing the latitudes of A and B, respectively. The course angle of azimuth which should be steered by a vehicle at A to proceed along $d$ is $C_A$. As the vehicle approaches B along its great circle path $d$, at successive points $A_1$, $A_2$, $A_3$, $A_4$, etc., the course angle $C_A$ changes continuously, and of course the distance D remaining to be travelled continuously decreases.

The invention provides apparatus which carries into effect the following trigonometric laws of spherical triangles:

$$L_{0B} - L_{0A} = L_0 \quad (1)$$

$$\cos d = \sin L_A \sin L_B + \cos L_A \cos L_B \cos L_0 \quad (2)$$

$$\cos C_A \sin d = \cos L_A \sin L_B - \sin L_A \cos L_B \cos L_0 \quad (3)$$

$$\sin C_A \sin d = \cos L_B \sin L_0 \quad (4)$$

$$\frac{\cos L_B \sin L_0}{\cos L_A \sin L_B - \sin L_A \cos L_B \cos L_0} = \frac{\sin C_A \sin d}{\cos C_A \sin d} = \tan C_A \quad (5)$$

$$\sqrt{(\cos L_B \sin L_0)^2 + (\cos L_A \sin L_B - \sin L_A \cos L_B \cos L_0)^2} = \sqrt{(\sin C_A \sin d)^2 + (\cos C_A \sin d)^2} = \sin d \quad (6)$$

In the first equation $L_{0A}$ and $L_{0B}$ represent the longitudes of A and B, respectively, and the equation follows directly from the definition of longitude when applied to the triangle of Fig. 1. Equations 2, 3 and 4 are derived directly from the laws of sines and cosines for spherical triangles, while Equations 5 and 6 are derived from Equations 3 and 4. Values representing longitudes and latitudes of different points are introduced into the computer in the form of angular dispositions of shafts of the various components of the apparatus illustrated in Fig. 2. These values of the angles mentioned above are represented by proportional displacements of rotor windings and shafts of synchros. The latitude of the destination, B, is represented in the computer by a proportional displacement of shaft 11 of a synchro 12, having a rotor winding 13 carried by the shaft 11 and two stator windings 14 and 16, the axes of which are spatially displaced by 90°. The synchro 12 is used as a trigonometric resolving device and therefore the rotor winding 13 is continuously excited by a constant alternating current potential from a source 15 which may be of any convenient frequency suitable for the design of the particular synchro employed, such as 60 cycles per second. Each stator winding has induced in it a potential proportional to $V \sin L_B$ or $V \cos L_B$, depending on where the zero position is considered to be, where V is the effective rotor potential. In this description V is taken as unity for simplicity. The potential induced in the stator winding 16 is thus considered to be $\cos L_B$ and that in winding 14 is $\sin L_B$.

As mentioned above, the vehicle proceeds from point to point along the approximate path of arc d, but for purposes of discussion it will be considered that the instant position of the vehicle is at point A.

The longitudes of the instant position and destination, $L_{0A}$ and $L_{0B}$, respectively, are represented by angular displacements of two shafts 17 and 18. These shafts are employed to position respective elements of a gear differential 19 which is adapted to cause an angular displacement of shaft 21, which is the algebraic difference between the displacements of shafts 17 and 18; the displacement or angular position of shaft 21 representing the angle $L_0$ of the triangle of Fig. 1. The shaft 21 carries a rotor winding 23 of a resolving synchro 22, similar to that described above. The rotor winding 23 is in series with the stator winding 16 of the synchro 12 and is therefore energized by a voltage proportional to $\cos L_B$. Accordingly, voltages will be induced in stator windings 24 and 26 of the synchro 22 which are proportional, respectively, to $\cos L_B \cos L_0$ and $\cos L_B \sin L_0$.

The latitude $L_A$ of the instant position of the vehicle is presented to the computer as the angular displacement of a shaft 27. This shaft 27 carries the rotor of a synchro 28. The rotor comprises two rotor coils 29 and 31, the axes of which are fixed at right angles to each other and the coils are angularly adjustable in unison with respect to the two stator coils 32 and 33. The axes of the stator coils 32 and 33 are disposed at right angles with respect to each other. This synchro 28 has a resolving function and in addition algebraically adds the separate effects of each of the two rotor coils upon each stator coil. The rotor coil 29 is connected in series with stator coil 14 of synchro 12 and therefore has impressed thereon a voltage proportional to $\sin L_B$. By reason of the angular disposition of the axis of coil 29, which is determined by the angular position of shaft 27, a voltage will be induced in stator coil 32, which is proportional to the product $\sin L_A \sin L_B$. Similarly, a voltage from stator coil 24, proportional to $\cos L_B \cos L_0$ is impressed across rotor coil 31 and by reason of the position of the axis of this rotor coil a second voltage will be induced in stator coil 32 which is proportional to $\cos L_A \cos L_B \cos L_0$. This latter voltage is added to the first induced potential to produce voltage in coil 32 the value of which is $\sin L_A \sin L_B + \cos L_A \cos L_B \cos L_0$. In like manner, the total potential induced in the stator winding 33 is $\cos L_A \sin L_B - \sin L_A \cos L_B \cos L_0$, the sign being negative when the other sign is positive because of the geometry of the synchro construction.

The synchro 34 has two rotor coils 39 and 43, the axes of which are at right angles to each other, and two stator coils 41, 42, the axes of which are likewise at right angles to each other. This synchro performs a function which is the opposite of that of a resolver, and may be termed an arc tangent solver. In addition, this synchro 34 performs a quadrature addition function. Preferably the synchro 34 is associated with an amplifier 36 and motor 37 arranged to constitute a servomechanism. The servo rotor winding 39 is connected to the input terminals of the amplifier 36, the output of which energizes the motor 37. The motor 37 is connected to the synchro 34 by means of a shaft 38 in such manner as to form a mechanical negative feedback connection. In operation, the potential induced in the rotor coil 39 from the field windings 41 and 42 energizes the amplifier 36 and through it the motor 37. The motor 37 turns the rotor of the servo 34 to that angular position at which the potential induced in the rotor coil 39 by the stator winding 41 is exactly cancelled by the potential induced in rotor 39 by the stator winding 42. The potential at the amplifier input terminals is therefore brought to zero and the motor stops, the angular position thereof then being representative of the angle $C_A$. That this is true is shown as follows: The potential induced in the rotor coil 39 by the stator coil 42 is $E_1 \cos C_A$, where $E_1$ is the potential across coil 42 and $C_A$ is the angle of the rotation of the shaft 38. Similarly, the potential induced in the coil 39 by the potential $E_2$ of the stator coil 41 is $E_2 \sin C_A$. When the rotor coil 39 has been servoed to zero potential these must be equal and opposite, or $$E_1 \cos C_A - E_2 \sin C_A = 0$$

and $$\frac{E_1}{E_2} = \frac{\sin C_A}{\cos C_A} \quad (7)$$

But the winding 42 is excited by potential received from the stator coil 26 of synchro 22 having the magnitude $\cos L_B \sin L_0$, which is $E_1$, and the winding 41 is excited by potential received from the stator coil 33 of synchro 28 having the magnitude $\cos L_A \sin L_B - \sin L_A \cos L_B \cos L_0$, which is $E_2$. The resulting value of $$\frac{E_1}{E_2}$$

is thus the same as the left-hand term of Equation 5 supra, so that in accordance with this latter equation and Equation 7 the motor torque will be zero when the displacement of shaft 38 represents the azimuth angle of a great circle route, $C_A$.

Since the axis of the second rotor winding 43 of the synchro 34 is at right angles to the axis of the winding 39, the maximum potential will be induced in winding 43 when the winding 39 has been servoed to its null point. This maximum is, of course, of the magnitude $$E_1 \sin C_A + E_2 \cos C_A$$

But this is in the form of the sum of two vectors having magnitudes $E_1$ and $E_2$ added at right angles, the magnitude of the resultant therefore being $$\sqrt{E_1^2 + E_2^2}$$

Substituting for $E_1$ and $E_2$ their values, the result is identical with the left side of Equation 6 and therefore, in accordance with this equation, has the value $\sin d$.

The synchro 44 has a single rotor winding 46 and two stator windings 51, 52 and is similar physically to the first described synchro 12. The winding 46 is connected into a servo loop including an amplifier 47, motor 48, and a shaft 49 which connects the rotor 46 and the motor. The two stator windings 51 and 52 are energized so that this synchro 44 functions as an arc tangent solver, being in this function similar to the synchro 34. The input to the stator winding 51 is obtained from the rotor winding 43 of the synchro 34 and equals $\sin d$ as has been described. The input to the stator winding 52 is composed of the induced potential in the stator 32 of the synchro 28, which is proportional to $$\sin L_A \sin L_B + \cos L_A \cos L_B \cos L_0$$

But this sum is identical with the right-hand side of Equation 2 and in accordance with this equation is therefore equal to $\cos d$. The two stators 51 and 52 are therefore energized by voltages proportional to $\sin d$ and $\cos d$, respectively, and if these values are substituted for $E_1$ and $E_2$ in the Equation 7, the null angle becomes equal to $d$, showing that the angular position of the shaft 49 is a measure of D, the distance, in terms of azimuth angle, remaining to the destination.

Devices other than synchros can be employed to perform all of the various functions of the synchros described in connection with Fig. 2. For instance, sine condensers as well as sine potentiometers can be used, although they both require somewhat more complicated connections and the addition of auxiliary equipment such as amplifiers.

It is obvious that the use of the present invention for navigating purposes is not restricted to any particular part of the earth's surface, but can be employed anywhere, including the southern hemisphere, or with the points A and B in opposite hemispheres. The present invention can also be employed in navigating over a course that approaches or passes over either pole without any loss of sensitivity.

The present invention is adaptable to navigating conditions where the points of departure and destination are fixed or changeable. For instance, if it is desired to proceed to a new fixed destination, a resetting of the $L_B$ and $L_{0B}$ input data shafts will result in production thereafter of output data for the new great circle course. If the destination should be a moving vessel, and its changing latitude and longitude are used as the $L_B$ and $L_{0B}$ inputs, the output data will at any instant be the present great circle course and distance to the present position of the mobile destination.

What is claimed is:

1. In an electromechanical computer, a first component comprising a rotatably adjustable element the angular displacement of which represents a given angular value, a pair of electrical elements responsive to the adjustment of said first element to provide separate alternating current output potentials whose ratios are trigonometric functions of said angular displacement; a second component comprising an electrical element energized by the electrical potential from one of said electrical elements of said first component and having an element for setting said electrical element of said second component in accordance with the difference between two input variables, said second component also including a second pair of electrical elements for deriving separate alternating current output potentials which are functions of the alternating current potential of said first component which energizes said electrical element of said second component and the position of said latter element; a third component having an electrical element energized by the alternating current potential of the other of said electrical elements of said first component and another electrical element energized by one of the alternating current output potentials of said second component, said electrical element of said third component being adjustable to represent a fourth variable, said third component also having an electrical element energized by the conjoint action of the other of its said electrical elements to provide an output alternating current potential which is a function of the energizing potential and relative angular displacement of said adjustable element and means energized from the electrical output element of said third component and the other of said electrical output elements of said second component for solving the function of said input variables in terms of arc tangents.

2. A computer for electrically making trigonometric computations, comprising a first component having an electrical element adjustable in accordance with a first variable; a second component having an electrical element adapted to be controlled in accordance with the difference between two variables; a third component having an electrical element adapted to be controlled in accordance with a fourth variable, said first component also having electrical elements operably associated with said first electrical element for producing separate alternating current potentials whose ratio is equal to a trigonometric function of the angular position of said first element, the adjustable electrical element of said second component being energized from one of the electrical elements of said first component and one of the electrical elements of said third component being energized from another of said electrical elements of said first component, said third component also having an electrical element associated with the adjustable element thereof and adapted to provide an output potential which is a function of the position of the adjustable element thereof; and a fourth component having one electrical element energized from the output of one of said electrical elements of said second component and having another electrical element energized by the output from one of said output elements of said third component for deriving a trigonometric function of the adjustments of said elements of said three components.

3. A computer for continuously computing great circle course angle and distance to destination for navigation of a vehicle comprising, a first resolver having an electrical element angularly adjustable in accordance with the latitude of the destination and having additional electrical elements adapted to provide separate output potentials proportional to the sine and cosine, respectively, of the latitude of the destination, a subtracting device adapted to be actuated in accordance with the instant longitude of said vehicle and the longitude of the destination to provide the difference therebetween, a second resolver having an electrical element connected to said subtracting device and adapted to be actuated in accordance with the difference between said longitudes, said second resolver having an additional electrical element electrically connected to said first resolver for actuation by the cosine output thereof, a third resolver having an electrical element adapted to be angularly adjusted in accordance with the instant latitude of said vehicle and connected to said first resolver for energization by the sine output thereof and having an additional electrical element connected to said second resolver for energization by the cosine output thereof, a first arc tangent solver servomechanism and quadrature adder electrically connected to said second resolver for energization by the sine output thereof and connected to said third resolver for actuation thereby and having an output shaft the angular displacement of which is representative of the course angle for a great circle route.

4. A computer for continuously computing great circle course angle and distance to destination for navigation of a vehicle comprising, a first resolver having an electrical element angularly adjustable in accordance with the latitude of the destination and having additional electrical elements adapted to provide separate potentials proportional to the sine and cosine, respectively, of the latitude of the destination, a subtracting device adapted to be actuated in accordance with the instant longitude of said vehicle and the longitude of the destination to provide the difference therebetween, a second resolver having an electrical element mechanically connected to said subtracting device and adapted to be actuated in accordance with the difference between said longitudes, said second resolver having an additional electrical element electrically connected to said first resolver for actuation by the cosine output thereof, a third resolver having an electrical element adapted to be angularly adjustable in accordance with the instant latitude of said vehicle and electrically connected to said first resolver for energization by the sine output thereof and having an additional electrical element connected to said second resolver for energization by the cosine output thereof, a first arc tangent solver servomechanism and quadrature adder electrically connected to said second resolver for energization by the sine output thereof and connected to said third resolver for actuation thereby having an output shaft, the angular displacement of which is representative of the course angle for a great circle route, and a second arc tangent solver servomechanism having one electrical element energized from an electrical output from said first arc tangent solver and a second electrical element energized from an output of said third resolver, said second arc tangent solver having a movable element operably associated with said electrical elements of said arc tangent solver, for indicating the distance to destination in terms of degrees of the arc of a circle.

5. A computer for electrically and continuously computing the great circle course angle for navigating a vehicle and for determining the remaining distance to a predetermined destination comprising; a first component including a pair of windings having their axes disposed in mutual space quadrature and a third winding operably associated with said pair of windings, the axis of which is adapted to be positioned in accordance with the latitude angle of the destination of the vehicle, means for energizing said third winding with an alternating current whereby voltages will be induced in said pair of windings which are proportional to the sine and cosine, respectively, of said latitude angle; a second component comprising a second pair of windings, the axes of which are disposed in space quadrature and a third winding operably associated with said second pair of windings and energized by the cosine output from said first component, said third winding of said second component being adapted to be adjustable in accordance with the difference between the longitude of the destination of the vehicle and the longitude of the instant position of said vehicle; a third component comprising a third pair of windings in mutual space quadrature and a fourth pair of windings disposed in mutual space quadrature operably associated with said third pair of windings and movable in unison relative to said third pair of windings, one of said fourth pair of windings being energized from the cosine output from said second component and the other of said fourth pair of windings being energized from the sine output from said first component, said fourth pair of windings adapted to be adjusted relative to said third pair of windings in accordance with the latitude of the instant position of said vehicle; and a fourth component comprising a fifth pair of windings the axes of which are disposed in mutual space quadrature, one of said latter pair of windings being energized by the sine output from said second component and the other of said latter pair of windings being energized by one of said third pair of windings of said third component, said fourth component including means responsive to the conjoint energization from said fifth pair of windings to indicate the course angle for a great circle route.

6. A computer as defined in claim 5 in which said fourth component also includes a sixth pair of windings the axes of which are disposed in mutual space quadrature and are operably associated with said fifth pair of windings and are adjustable in unison with respect thereto; and a fifth component comprising a seventh pair of windings the axes of which are arranged in mutual space quadrature, one of said latter pair of windings being energized by one of the outputs from said third component and the other of said latter pair of windings being energized from one of said sixth pair of windings of said fourth component, said fifth component also including a movable element responsive to the conjoint energization of said seventh pair of windings for indicating the remaining distance to destination in terms of degrees of an arc of a circle.

7. A computer as defined in claim 5 in which said fourth component includes an additional winding operably associated with said fifth pair of windings and adjustable with respect thereto, means associated with said additional winding and responsive to the energization of said additional winding to constitute a servo-mechanism for indicating the course angle of a great circle route.

8. A computer as defined in claim 5 in which said fourth component includes a sixth pair of windings the axes of which are disposed in mutual space quadrature with respect to each other and are operably associated with, and adjustable in unison with respect to, said fifth pair of windings, means energized by one of said sixth pair of windings to constitute said fourth component a servomechanism for indicating the course angle for navigation on a great circle route; and a fifth component comprising a seventh pair of windings disposed in mutual space quadrature and an additional winding operably associated with said seventh pair of windings and adjustable with respect thereto, and means energized from said additional winding to constitute said fifth component a servomechanism for deriving a function of the setting of said first three components to indicate the remaining distance to destination in terms of degrees of an arc of a circle.

9. A computer for electrically computing a great circle course angle for navigating a vehicle and for determining the remaining distance to a predetermined destination comprising; a first component having a pair of electrical elements, a third electrical element, a source of alternating current for energizing said third element, said third element being operably associated with said pair of elements in such a manner as to derive separate voltages from said third element which are proportional to the sine and cosine functions of the angles of relative displacement between said third element and said pair of elements; a second component comprising an element energized from the cosine output of said first component and a second pair of elements adapted to derive voltages from said element which are proportional to the sine and cosine respectively of the angular displacement between said element and said pair of elements, said element being adapted to be positioned relative to said pair of elements in accordance with the difference between the longitude of the destination of the vehicle and the longitude of the instant position of said vehicle; a third component comprising a third pair of electrical elements and a fourth pair of electrical elements, one of said third pair of elements being energized from the cosine output from said second component and the other of said fourth pair of elements being energized from the sine output of said first component, said third and fourth pair of elements being relatively adjustable in accordance with the latitude of the instant position of said vehicle; a fourth component comprising a fifth pair of electrical elements one of which is energized from the sine output of said second component and the other of which is energized from the cosine output from said third component, said fourth component including means responsive to the conjoint energization of said fifth pair of elements to indicate the course angle for a great circle route.

10. A computer as defined in claim 9 in which said fourth component includes a sixth pair of elements one of which is responsive to the energization of said fifth pair of elements to indicate the course angle for a great circle route; and a fifth component comprising a seventh pair of elements one of which is energized by the sine output from said fourth component and the other of which is energized by the cosine output of said third component, and means responsive to the conjoint energization of said seventh pair of elements to indicate the remaining distance to destination in terms of degrees of an arc of a circle.

11. A computer as defined in claim 9 in which said fourth component includes means adapted to derive an arc tangent function from the voltages represented by the adjustment of said three components to indicate the course angle for a great circle route.

12. An electrical computer comprising a first component having an element adapted to be energized by a constant voltage and a first pair of elements adapted to obtain voltages from the energization of said first element which are proportional to the sine and cosine of a first angle; a second component comprising an element energized by the cosine output from said first component and having a pair of elements adapted to derive voltages which are proportional, respectively, to the product of the cosine of said first angle and the sine of a second angle and another voltage which is proportional to the product of the cosine of said first angle and the cosine of said second angle; a third component comprising a third pair of elements one of which is energized by the voltage output from said second component which is proportional to the cosine of said first angle and the cosine of said second angle and the other of which pair is energized by a voltage proportional to the sine of said first angle, said third component comprising another element which is operably associated with said third pair of elements to derive a voltage from the conjoint energization thereof which is proportional to the cosine of a third angle times the sine of said first angle minus the sine of said third angle times the cosine of said first angle times the cosine of said second angle; a fourth component comprising a fourth pair of elements one of which is energized from said latter output from said third component and the other of which is energized by the output proportional to the product of cosine of said first angle times the sine of said second angle and means responsive to the component energization of said fifth pair of elements to derive an arc tangent function of said three angles.

13. A computer as defined in claim 12 in which said fourth component includes a sixth pair of elements operably associated with said fifth pair of elements so that one of said sixth pair derives a voltage from the conjoint energization of said fifth pair of elements which is proportional to the arc tangent function of said three angles; and a fifth component comprising a seventh pair of elements one of which is energized from the other of said sixth pair of elements and the other of which is energized from the cosine output of said third component and an indicating means responsive to the conjoint energization of said seventh pair of elements.

14. A computer as defined in claim 12 in which said fourth component comprises an element operably associated with said fifth pair of elements and to the means representing said arc tangent function to provide an output voltage which is the quadrature sum of the conjoint energization of said fifth pair of elements; and a fifth component comprising a seventh pair of elements, one of which is energized from said quadrature sum output from said fourth component and the other of which is energized from the other of said third pair of elements and indicating means responsive to the conjoint energization of said seventh pair of elements.

References Cited in the file of this patent

UNITED STATES PATENTS

| Number | Name | Date |
| --- | --- | --- |
| 2,382,994 | Holden | Aug. 21, 1945 |
| 2,465,624 | Agins | Mar. 29, 1949 |
| 2,467,646 | Agins | Apr. 19, 1949 |
| 2,486,781 | Gittens | Nov. 1, 1949 |
| 2,519,180 | Ergen | Aug. 15, 1950 |

OTHER REFERENCES

"Electronic Instruments"; Greenwood, Jr. et al.; McGraw-Hill Book Company, Inc.; New York; 1948; Figs. 5.27–5.29, 6.4, 6.22–6.25 and 7.13.